No. 628,858. Patented July 11, 1899.
A. M. SCHMITT.
WAGON BODY.
(Application filed June 6, 1898.)
(No Model.)
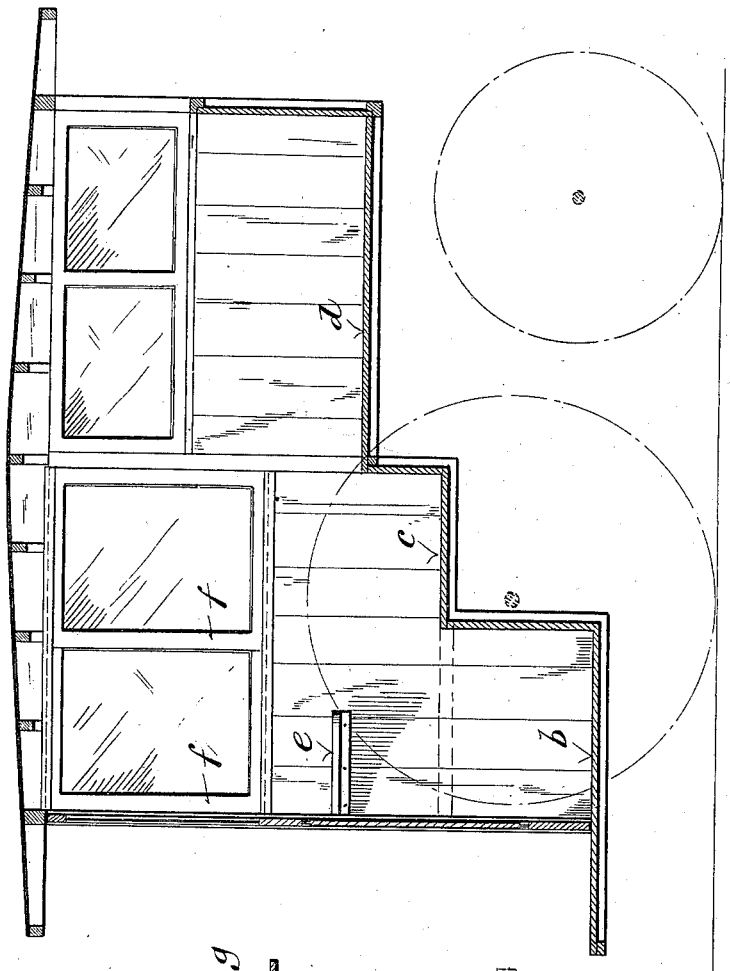
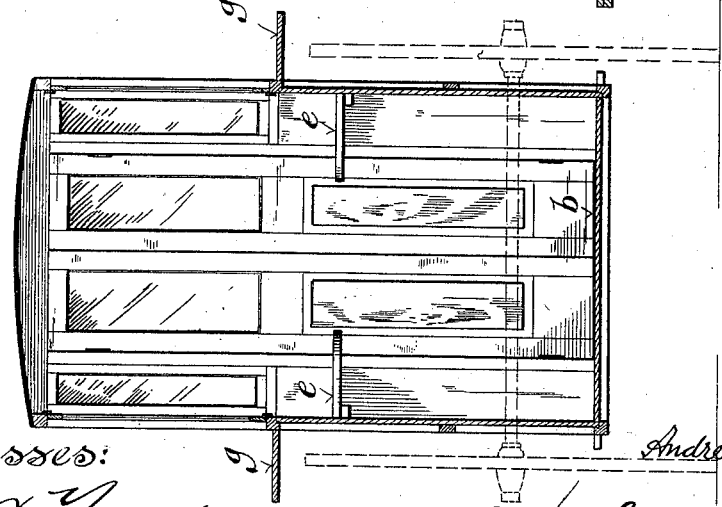

UNITED STATES PATENT OFFICE.

ANDREW M. SCHMITT, OF MILWAUKEE, WISCONSIN.

WAGON-BODY.

SPECIFICATION forming part of Letters Patent No. 628,858, dated July 11, 1899.

Application filed June 6, 1898. Serial No. 682,652. (No model.)

*To all whom it may concern:*

Be it known that I, ANDREW M. SCHMITT, a citizen of the United States, and a resident of Milwaukee, in the county of Milwaukee and State of Wisconsin, have invented certain new and useful Improvements in Wagon-Bodies; and I do hereby declare that the following is a full, clear, and exact description thereof.

My invention has for its object to increase the capacity of delivery-wagons, provide for short turns of the same, and to render them more safe and convenient than those of ordinary build, especially designed for the delivery of milk, bakery goods, laundry-packages, and store-parcels.

It therefore consists in the structural peculiarities of the wagon-body, hereinafter set forth with reference to the accompanying drawings and subsequently claimed.

Figure 1 of the drawings represents a vertical longitudinal section of a wagon-body constructed in accordance with my invention; and Fig. 2, a transverse section of the same, looking toward the rear.

Referring by letter to the drawings, it will be seen that the bottom of my improved wagon-body in its preferred form has three levels $b$ $c$ $d$ and that the lower level will be wholly in rear of and below the hind axle of the running-gear, the intermediate level being at some distance above said axle. The upper forward level will come over the front axle of the running-gear, and the front wheels of this gear will be of sufficiently small diameter to run under said upper forward level of the wagon-body when turns are made. Consequently the turns may be very short in proportion to the length of the vehicle, the hind and front wheels being at all times closer together than is customary in the running-gear of delivery-wagons as ordinarily built.

As herein shown, the wagon-body may be covered and have a rear end wall provided with a door-closed aperture and glazed windows. The lower level of the wagon-body projects back of the rear end wall to form a step that comes a short distance above the surface over which the vehicle travels. Therefore ready entrance and exit may be had with respect to said wagon-body.

The driver of the vehicle occupies the space within the wagon-body in rear of its intermediate level, and this space is shown provided with rear corner-seats $e$ for the convenience of said driver.

The side walls of the wagon-body may be provided with upper openings, as herein shown, and these openings may be closed by means of glazed sash, as is also herein shown, the rear side sashes $f$ being preferably of the sliding variety, whereby merchandise may be handed out or taken in at the sides of the wagon or ventilation of the latter regulated by the driver. Instead of glazed sashes blind-sashes may be utilized, or both may be employed.

The front wall of the wagon-body is shown provided with an upper opening, and the latter may be glazed, if found desirable, provision being had for free play of driving-reins.

Below the rear side openings in the wagon-body the latter is shown provided with outer lateral shelves $g$, that also serve as mud-guards over the hind wheels of the running-gear.

The wagon-body herein shown is especially designed for the milk trade, the intermediate and upper levels of the bottoms serving as platforms upon which to set cans; but for bakery goods, laundry-packages, and store-parcels it may be found desirable to inclose space above said levels and provide the compartments thus formed with shelving.

Having thus described my invention, what I claim as new, and desire to secure by Letters Patent, is—

1. A three-level wagon-body having its lower level arranged to come wholly below and in rear of the hind axle of the running-gear, the next succeeding level being at an elevation somewhat greater than that of said axle and its upper forward level at an elevation greater than that of the front wheels of said running-gear.

2. A wagon-body having a rear compartment provided with side openings and stepped to form two levels the lower one of which comes below and wholly in rear of the hind axle of the running-gear, the upper forward portion of the body being at an elevation greater than that of the front wheels of said running-gear, and shelves on the outside of the rear compartment convenient to the openings aforesaid.

In testimony that I claim the foregoing I have hereunto set my hand, at Milwaukee, in the county of Milwaukee and State of Wisconsin, in the presence of two witnesses.

ANDREW M. SCHMITT.

Witnesses:
N. E. OLIPHANT,
ALBERT GUMZ.